May 12, 1970 A. J. BEPRISTIS ET AL 3,511,294
EMERGENCY TIRE INFLATION SYSTEM
Filed Dec. 18, 1967 4 Sheets-Sheet 1
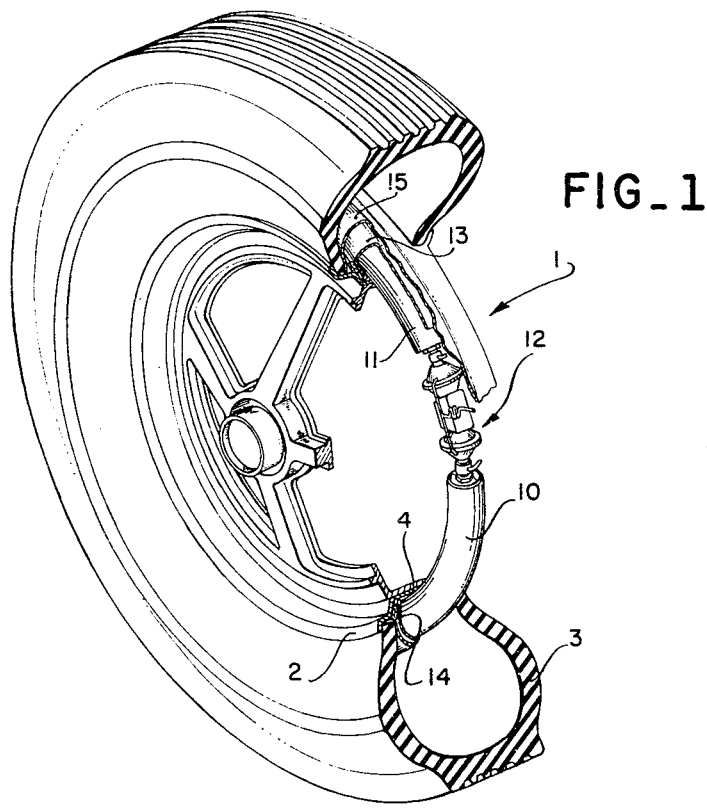
FIG_1
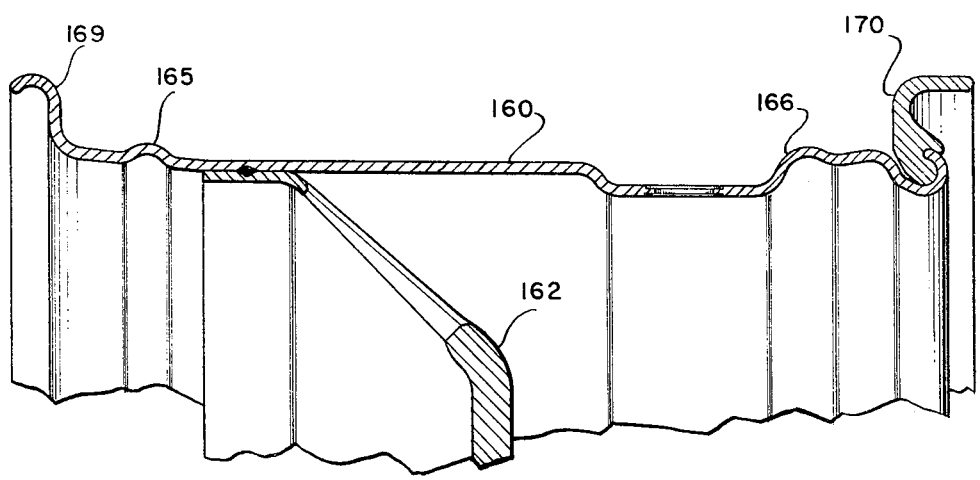
FIG_5
INVENTORS
ANDREW J. BEPRISTIS
IRVIN TROWBRIDGE, JR.
By *George C. Sullivan*
Agent

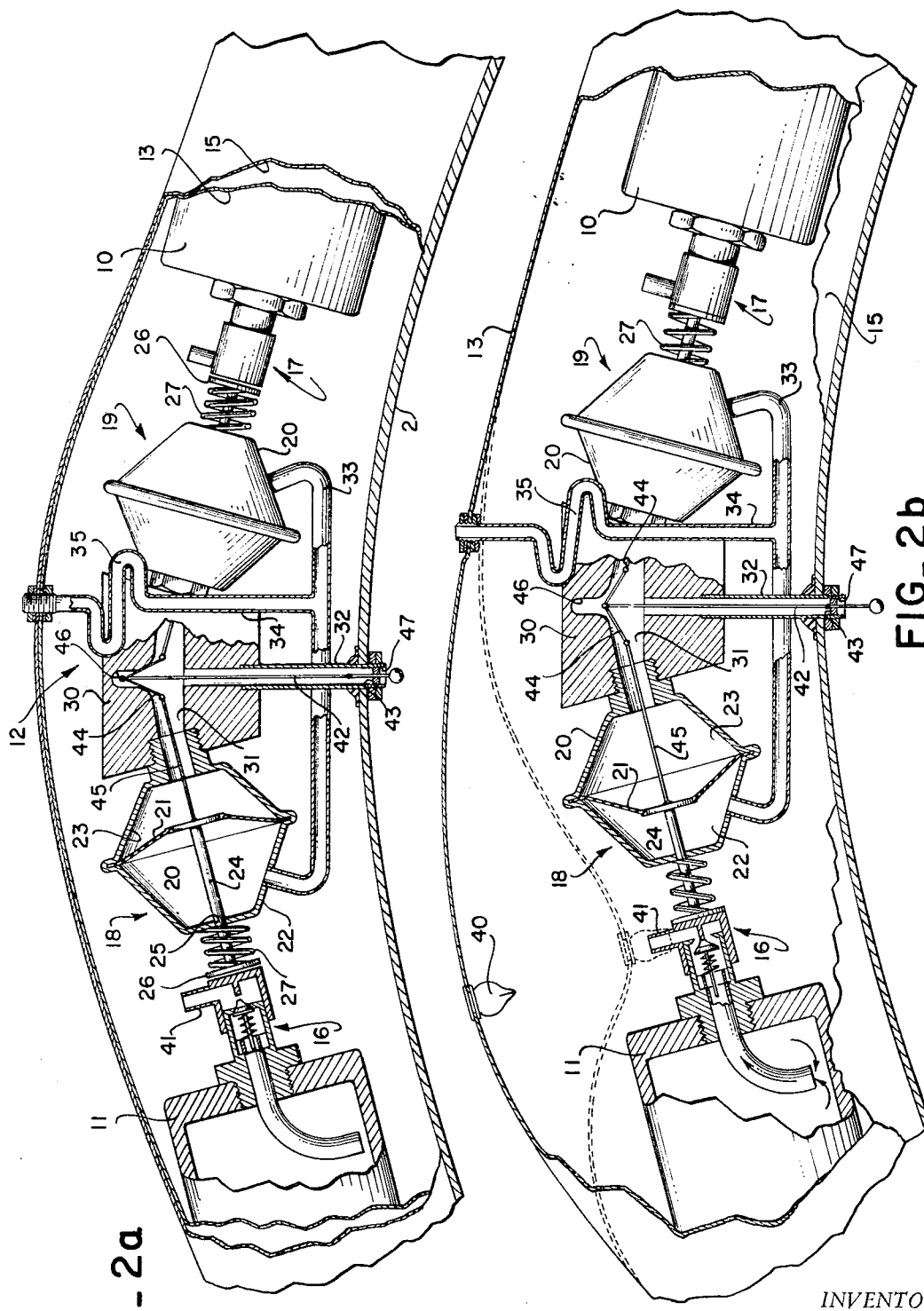

May 12, 1970 A. J. BEPRISTIS ET AL 3,511,294
EMERGENCY TIRE INFLATION SYSTEM
Filed Dec. 18, 1967 4 Sheets-Sheet 3
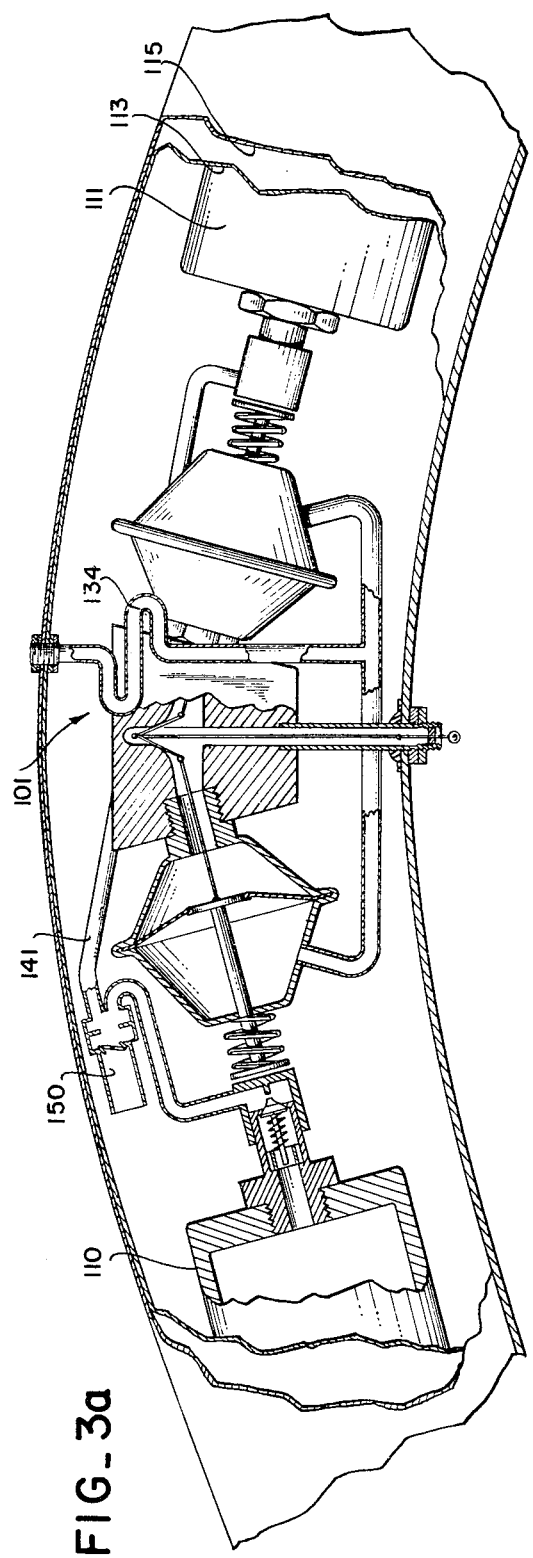
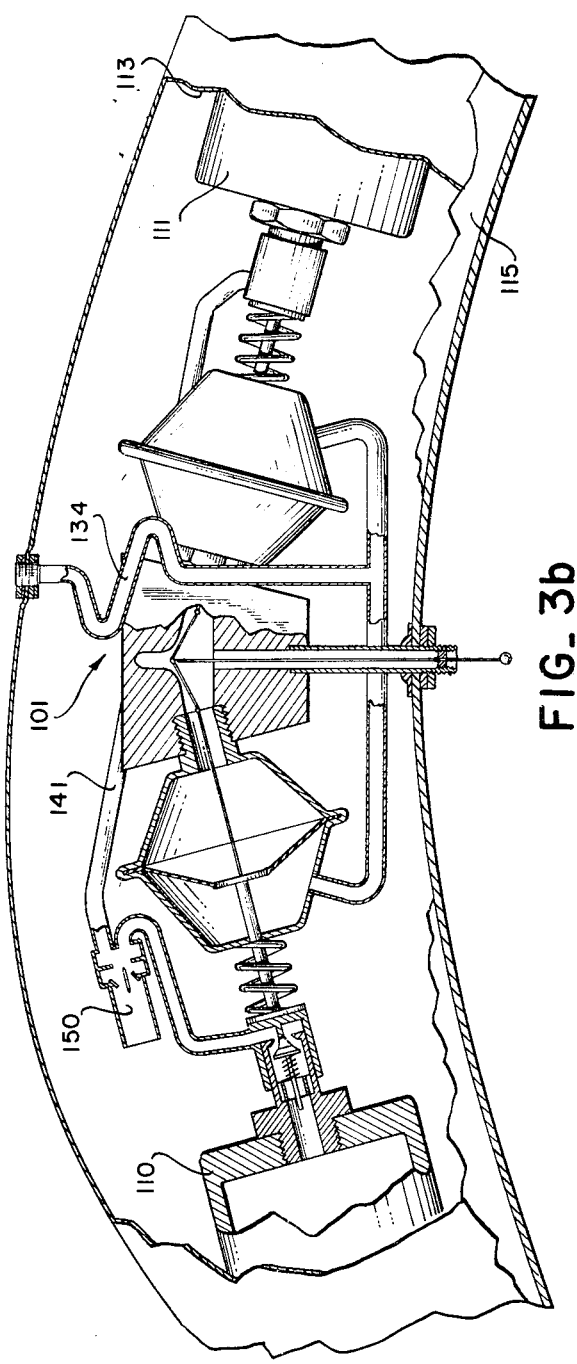
INVENTORS
ANDREW J. BEPRISTIS
IRVIN TROWBRIDGE, JR.
By George C. Sullivan
Agent May 12, 1970  A. J. BEPRISTIS ET AL  3,511,294
EMERGENCY TIRE INFLATION SYSTEM
Filed Dec. 18, 1967  4 Sheets-Sheet 4
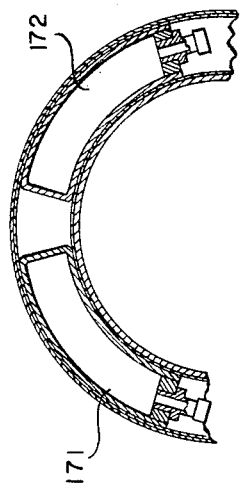
FIG_6
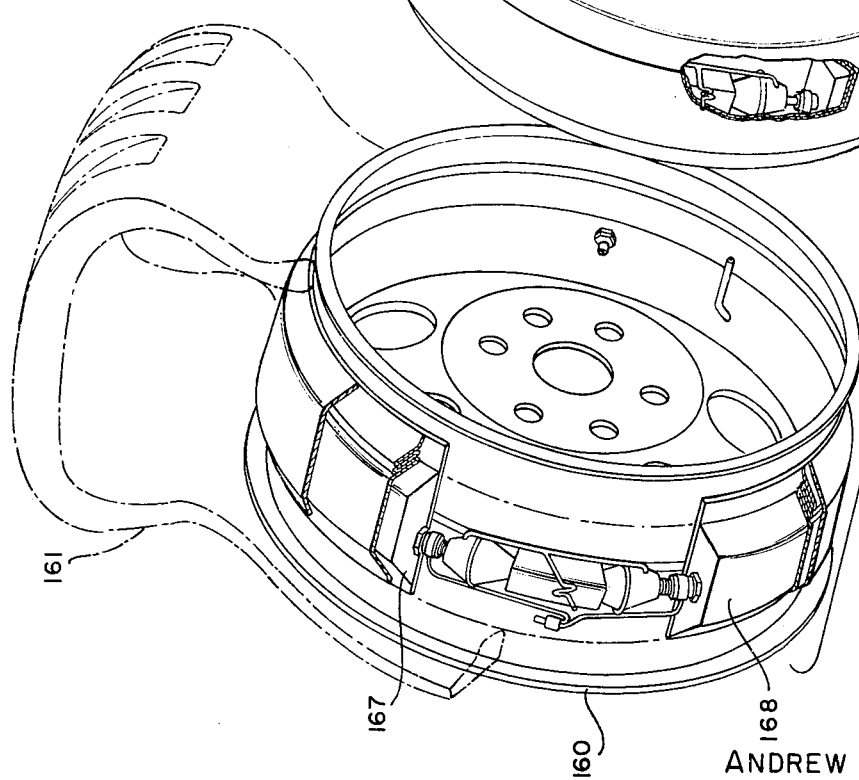
FIG_4
*INVENTOR.*
ANDREW J. BEPRISTIS
IRVIN TROWBRIDGE, JR.
By *George C. Sullivan*
Agent United States Patent Office 3,511,294
Patented May 12, 1970

3,511,294
EMERGENCY TIRE INFLATION SYSTEM
Andrew J. Bepristis, Santa Clara, and Irvin Trowbridge, Jr., Mountain View, Calif., assignors to Lockheed Aircraft Corporation, Burbank, Calif.
Filed Dec. 18, 1967, Ser. No. 691,578
Int. Cl. B60c *23/00*
U.S. Cl. 152—418                                    14 Claims

ABSTRACT OF THE DISCLOSURE

A system is shown for maintaining pressure, form and firmness in a pneumatic tire which protects from "slow leaks" and which also protects from sudden blowouts, the system including pressurized cylinders of fluid (air or chemical reagents) which are adapted to fit within the tire about the periphery of the wheel rim so that, upon automatic actuation by a drop in air pressure, the contents of the cylinders are released to reinflate or maintain proper inflation and form of the tire.

---

This invention relates generally to the field of pneumatic tires and is particularly related to a system for maintaining pressure or contour of such a tire. As tires for various types of vehicles passed beyond the solid tire stage into pneumatic systems, the need for protecting the tire from punctures or air losses became increasingly important. The need for a reliable system has been increased in recent years as the environment in which pneumatic tires are required to perform has increased in severity and includes danger not only from heat build-up, overloading and concussions due to "chuck holes," but also from "projectiles" such as bullets, shrapnel and the like when pneumatic tires are used in combat situations.

Lower cost, greater ease of handling and servicing and the flexibility of tired, as distinct from "tracked" vehicles, has been difficult to realize because of the fact that increasing loads have been placed on combat tires. In an effort to sustain these loads "combat tires" have been built by incorporating thick, heavy, stiff sidewalls into the tire carcass so that in the event of loss of air pressure the tire is structurally strong enough to support the vehicle for a limited period of time in order to allow the vehicle to continue operations or come to a safe halt. Tires of this construction, however, do not lend themselves to the improved mobility that is being demanded of military wheeled vehicles and which is being afforded by the large cross-section of extremely flexible low pressure tires. Increasing the strength and number of plies in such tires has often resulted in increased heat buildup which ultimately leads to shorter life or breakdown at high speeds.

An automatic inflation system which would be almost instantaneously responsive and operable to a lower pressure caused by a puncture, shock loading of a tire or slow leak is desirable not only to increase the safety of modern high-speed automobiles, which are also incorporating lower and wider tread design, but is also important for "off-the-road" vehicles used in the lumber industry, forest service, agricultural, and other lines of service. The inventors have also recognized the desirability of such an automatic inflation system to the aircraft industry for the tires of aircraft landing gears and to the aforementioned military vehicles.

It is an object of the present invention, therefore, to provide an automatic system for re-inflating or recontouring a vehicle tire which has been damaged or which has incurred a lessened capability to maintain pressure.

Another object of this invention is to provide a system for reinflating or maintaining the inflation of a tire which involves the reaction of at least two different chemical compounds within the tire to produce an almost instantaneous foam and pressure so as to maintain the original contour and shape of the tire. (As used herein, it should be understood that the term "inflation" is inclusive of not only maintaining the pneumatic pressure in a tire, but also includes the filling of a tire with "foam" or other semi-rigid chemical substance to maintain tire body shape and contour.)

It is a further object of the present invention to provide a system utilizable in the pneumatic tires which is lower in cost and faster in operation than previously was possible.

A further object of the invention is to provide a system for reinflating a vehicular tire in such a manner that the tire will have a capability of running many times farther than previous tires were able to run after being subjected to an otherwise incapacitating event. These and other objects of the invention will readily appear to those interested in this particular art as well as those skilled in the field and such objects are intended to be included within the intent and interpretation of the specification and the claims appended thereto.

PRIOR ART

The prior art has attempted to provide a number of solutions to the problems outlined hereinabove and have included the provision of sand, (U.S. Pat. 596,436 dated 1897) or a viscous solution of plumbago, glycerin and fuller's earth (U.S. Pat. 614,416, dated 1898) in the casings. Other patents have provided reservoirs for compressed air which was adapted to be slowly metered into a tire experiencing slow leaks, for example, U.S. Pat. 1,128,455, dated 1915. Another proposal was the inclusion of a sponge rubber material within the tire casing (U.S. Pat. 2,237,245, dated 1941). This was, of course, subject to the build-up of heat caused by friction as the tire rotated either in a dormant or "triggered" position and was also subject to the problems of balancing which are so important on modern high r.p.m. tires.

None of the prior artisans have provided a practical automatic system within the tire casing for maintaining or re-inflating an automotive tire which can be operated at high r.p.m. and which is not subject to balance problems or heat caused by friction between intervening layers of materials.

DESCRIPTION

In light of the above discussion, the instant invention will be more easily understood by a reference to the attendant drawing figures wherein FIG. 1 is a general three-dimensional showing of an emergency tire inflation system constructed in accordance with the invention, FIG. 2a shows the reservoirs and sensing mechanism of a pneumatic re-inflation system in a "dormant" position, FIG. 2b shows the system FIG. 2a in a "triggered" or operative position, FIG. 3a shows a reservoir and sensing mechanism for a dual chemical system in "dormant" position, FIG. 3b shows the system of FIG. 3a in an operative or triggered position.

FIG. 4 shows a tire inflation system in accordance with the present invention as it might be installed on a vehicle rim, the system being slightly modified in shape so as to accommodate modern "flat" rims utilized in connection with military vehicles, and FIG. 5 is a view showing in cross-section such a "flat" rim.

Turning now to FIG. 1, numeral 1 generally designates the emergency tire inflation system concept in accordance with the present invention. This system is mounted upon a conventional rim 2 which is adapted to support a tire 3 in the normal manner. Mounted within the lower central portion 4 of rim 2 is a tire inflation system constructed in accordance with the teachings of this invention. This system is seen to comprise a pair of arcuate reservoirs 10 and 11 which are mounted on rim 2.

In accordance with one modification of the invention, the reservoirs 10 and 11 and their actuating assembly 12 are covered by a diaphragm or blowout liner 13. Diaphragm 13 is flexible and is folded as indicated at 14 so as to provide a capability for considerable "expansion." The diaphragm is held in place and the entire system 1 is covered by a "securing liner" 15.

Referring to FIGS. 2a and 2b, a tire inflation system is described which operates by compressed air or other suitable fluid.

As noted in FIG. 1, the tire inflation system is mounted upon a rim 2 and is enclosed within a diaphragm or blowout liner 13 which in turn is covered by and secured in its dormant position as shown in FIG. 2a by a securing liner 15. It is noted that securing liner 15 may completely surround and more or less "encapsulate" tire inflation system 1 or, alternatively, it may be secured at either side of the rim in such a manner as to provide a securing function for blowout liner 13. As shown in FIG. 2a, showing the system in a "dormant" position, the reservoirs 10 and 11 are provided with pressure sensitive valves 16 and 17 which are constructed in accordance with well-known principles. These valves 16 and 17 may be actuated to release the contents of reservoirs 10 and 11 upon the application of mechanical pressure. Such pressure is provided in the invention by a pair of "dashpot" mechanisms 18 and 19. Dashpots 18 and 19 are essentially identical in construction and operation and include a housing 20 which is provided with an internal pressure diaphragm 21 secured at its periphery to the dashpot housing 20 in a perimetric relationship so as to provide a tire pressure sensing chamber 22 and an atmospheric pressure sensing chamber 23 on opposite sides of the diaphragm. Secured to one side of pressure diaphragm 21 is a plunger 24 which is attached to the diaphrgam 21 in any acceptable manner and which sealingly extends through an aperture 25 in housing 20. Plunger 24 terminates in a flattened portion 26. A tire pressure spring 27 is mounted between the flattened portion 26 and the outer side of dashpot housing 20 so as normally to urge pressure diaphragm 21 to a position where the plunger 24 will be pressed against valve 16 in a manner adapted to actuate the valve and release the pressure and fluid contained in the reservoirs 10 and 11.

Dashpots 18 and 19 are adapted to be threadably received within a mounting block 30. Mounting block 30 is provided with an atmospheric channel 31 which pneumatically associates the atmospheric pressure sensing chambers 23 of each of the dashpots 18 and 19 and which is also open to the atmosphere through atmosphere vent tube 32 which preferably opens into the lower or "inner" surface of the rim 2. It is noted that vent tube 32 is hermetically sealed within block 30 in any suitable manner as by brazing, adhesives, screw threads, or the like.

Tire pressure sensing chambers 22 within dashpots 18 and 19 are both connected by a channel 33 which in turn is in pneumatic registry with a tire pressure sensing tube 34. Tire pressure sensing tube 34 is provided with a flexible portion as shown at 35 which terminates in a tip which extends through diaphragm or blowout liner 13 in a sealed, hermetic manner so that as diaphragm or blowout liner 13 is caused to expand in a manner hereinafter to be described, the tire pressure sensing tube 34 will expand with it until the sensing tube 34 comes into contact with the tire casing.

It is noted that blowout liner 13 is adapted in its dormant position, which in this case is shown in the dotted lines in FIG. 2b, to be associated with valve 16 in such a manner that as valve 16 is actuated and pressure is applied to the inside of the blowout liner 13, as for example by valve 17, that the diaphragm or blowout liner 13 will slip off of and out of registry with valve 16. For this purpose a resilient plug 40 is sealed within an aperture in blowout liner 13. The lower portion of plug 40 is normally constricted but in its expanded mode it can be placed over the outlet 41 of valve 16. The selective provision of such a plug 40 within the blowout liner 13 will be described hereinafter under the "Operation" of the device. To "load" or "arm" the inflation system 1 it is necessary to "withdraw" diaphragm 21 against springs 27 until a tire (not shown) can be pressurized to its operating pressure. For this purpose the mechanism shown within the mounting block 30 is provided. This arming mechanism 41 is seen to consist of a control shaft 42 which is provided at its "rim" end with a suitable shoulder 43 and terminates at the opposite end in a pair of lever arms 44 which are in turn pivotally connected to rods 45. Rods 45 are secured at their opposite ends to the diaphragms 21 in dashpots 18 and 19. It will be noted that control block 30 is provided with an arming cavity 46, the diameter of which is carefully selected to provide a "necking down" action as the lever arms 44 are forced into the arming cavity 46 by action of the control shaft 42 which is acted upon or pushed from the outer end by a suitable tool or instrument acting against shoulder 43. Actuation of the control shaft causes rods 45 to pull diaphragms 21, acting against springs 27, in such a manner as to release mechanical pressure from the valve 16. Vent tube 32 may be provided at its outer end with threads as indicated at 47 so as to secure an actuating tool or plug (not shown) within the shaft and against shoulder 43 to maintain the mechanism just described in a position whereby the diaphragms 21 are held out of engagement with the valves 16.

OPERATION—FIGS. 2a AND 2b

The tire inflation system shown in FIGS. 2a and 2b is adapted to operate automatically by the action of actuating assembly 12 sensing a difference in pressure between the pressure inside the tire and atmospheric pressure. After the mechanism has been "armed" and pressure built up within the tire, it will be seen that the pressure within the tire, acting through the tire pressure sensing tube 34, will operate to maintain the diaphragms 21 in dashpots 18 and 19 in a "retracted" or non-operational mode. However, if a blowout occurs, a reduction of pressure within tire pressure sensing chambers 22 of dashpots 18 and 19 will cause the atmospheric pressure impinging upon the opposite sides of the diaphragms 21 to move the diaphragm 21, moving plungers 24. These plungers, accentuated in their action by springs 27, will impinge or press upon valves 16 so that the fluid compressed within reservoirs 10 and 11 will be released. At such event the frangible securing liner 15 is broken or ripped by blowout liner 13 being pressed thereagainst and the blowout liner 13 then is fully inflated by the continuing release of fluid from the reservoirs 10 and 11 to assume, through unfolding and natural resiliency, the function of a conventional tube acting to maintain a tire in an inflated relationship. It should be understood that this inflation of blowout liner 13 preferably takes place extremely rapidly so that the tire is almost immediately reinflated (or not allowed to completely deflate) thus assisting the driver in a vehicle upon which the tire is mounted to maintain control. In this "triggered" mode, the tire can be operated for an extended period.

As an additional feature of the present invention, it is noted that the mechanism can be operated utilizing the structure shown in FIG. 2b to provide constant repressurization of a tire as pressure is lost due to a "slow leak."

In fact, by eliminating blowout liner 13, the mechanism will function effectively in this manner by operation of both reservoirs 10 and 11.

If, however, it is desired to take advantage both of the blowout protection and constant inflation, the mode shown in FIG. 2b is to be selected. In this mode, blowout liner 13, as shown in dotted lines, is shown to be provided with a plug 40 which, as previously noted, may because of its resiliency, receive the outlet tube of valve 16. Thus, as pressure slowly drops within the tire, this pressure drop is sensed by the tire pressure sensing tube 34 and, as caused by differential pressure, plunger 24 acts upon valve 16 to release enough fluid through plug 40, and through blowout liner 13, into the tire. In this mode it may be desirable to provide valve 17 associated with reservoir 10 with a "butterfly" or other type valve which could be easily overridden or ruptured upon the occasion of a blowout in which event the fluid within reservoir 10 would be immediately released and blowout liner 13 would inflate. This would cause blowout liner 13 and plug 40 to slide off of the output tube of valve 16. The resiliency of the material of plug 40 and the combination of pressure exerted against the small end of the plug would easily operate to maintain the plug 40 in a sealed manner so as to prevent the escape of air through blowout liner 13.

It should be understood that while the invention has been described in connection with two reservoirs, that it is intended to be broadly construed to cover one such reservoir acting both as a blowout preventer and pressure maintaining medium. Similarly, a plurality of cylinders could be provided within the same tire to provide for redundancy and a more "fail-safe" structure.

FOAM SYSTEM—DESCRIPTION

In FIGS. 3a and 3b, an emergency tire inflation system 101 is shown which is very similar to that described in connection with FIGS. 2a and 2b hereinabove. In this modification, however, the reservoirs 110 and 111 are filled with chemical compounds which react upon contact with each other to produce a "foam," or semi-rigid structure. This foam is of such a nature and is formed rapidly enough to allow for very rapid "re-inflation" and reconstitution of a tire after a blowout. While various types of chemical compositions may be utilized, the inventors have found that the following are exemplary of the present state-of-the-art:

EXAMPLE 1

A composition known as "CPR 2032A" is placed in one of the reservoirs 110 or 111. This material is a prepolymer prepared from a propoxylated glycerine glycol and toluene-diisocyanate. Into the other cylinder is placed a composition known as "CPR 2032B" which contains a propoxylated glycerine polyol, distilled water, silicone oil and tertiary amino catalysts. These compositions are available from the Upjohn Company, CPR Division, 555 Alaska Ave., Torrance, Calif. Upon actuation of the cylinders, the two compositions, upon mixing, react to produce a foam or semi-rigid structure suitable to use in connection with the invention.

EXAMPLE 2

Into one of the reservoirs 110 or 111 is placed a polymer called polymer 666T (isocyanate) which is a toluene-diisocyanate, MBI type silicone oil composition. The other reservoir is charged with polymer 666R (polyol) which is poly-ether resin, amine catalyst silicone oil, polymers P1166 and freon 11B composition. These compounds are available from Polymir Industries, Inc., 2036 National Ave., Hayward, Calif. 94545.

The foaming systems referenced in Examples 1 and 2 above, and an automobile tire fitted out with the tire inflation system 101 were actuated and, within a period of 15 seconds during which the wheel travelled 25 feet, completely re-inflated the tire so as to reconstitute its original shape which allowed the "jeep" vehicle upon which it was mounted to proceed in a normal fashion. The tire was later cut open and the foam was found to have penetrated substantially all of the space between the rim and the tire in an acceptably uniform fashion.

It is noted that the emergency inflation system 101 would not be used to maintain a tire at a constant pressure due to a slow leak but would be adapted to use as a blowout remedy. The system may be provided with a securing liner 115 and a blowout liner 113 in the same manner as described in connection with FIGS. 2a and 2b though it is noted that the system would be operable without the use of either the securing liner 115 or the blowout liner 113. This liner would be desirable, however, for use where the tire was punctured by a projectile or accident which left a considerable hole in the casing. (A nail or other blowout producing object of relatively small diameter would not normally necessitate the use of a blowout liner.)

System 101 is actuated and operates in much the same manner as the system described in connection with FIGS. 2a and 2b with the exception that the output pipes 141 are both connected to a mixing chamber 150 wherein the chemicals from reservoirs 110 and 111 are brought together, upon actuation of the system, to inter-mix and spontaneously produce the desired foam structure to fill the tire and re-inflate it. It is obvious that if a blowout liner was not used, tire pressure sensing tube 134 would not be sealed to the blowout liner but would project into the annular space within the tire casing. The system 1, or 101, is substantially protected from damage upon blowout and deflation by the upstanding projections on the wheel rim upon which it is mounted.

"Flat Rim" FIGS. 4 and 5 show an emergency tire inflation system as described at 1, or 101, above, modified for mounting upon a so-called "flat" rim 160 which accommodates modern tires which have been designed to operate at lower pressures and top rovide a larger "footprint" of the vehicle on the ground over which it passes. Such a tire is shown at 161. In FIG. 5, rim 160 is shown in cross-section which is supported by the "wheel" 162. To accommodate this rim 160, an emergency tire inflation system assembly as shown at 163 is mounted upon a generally circular backing member 164 which fits over the flat rim and is adapted to be positioned between the "humps" 165 and 166 upon the flat rim, which positions the assembly 163 in a fashion to prevent lateral movement upon the rim.

Mounted upon the backing member 164 is an automatic tire inflation system as provided in FIGS. 2a and 2b or 3a and 3b. However, in the event of the utilization shown in FIGS. 4 and 5 it is desirable to make the reservoirs generally flat on their bottom surface next adjacent the backing member 164 and of a generally rectangular shape as is shown in 167, 168 in FIG. 4. This shape allows the reservoirs in the automatic tire inflation assembly to conform to the generally flat shape of the rim 160.

OPERATION

In mounting a tire upon a rim such as shown in FIGS. 4 and 5, a tire casing 160 has one bead placed over the flat rim with this bead being snugged up against the upstanding flange 169. The automatic tire inflation assembly is then slid on the rim 160 and the other bead of the tire is placed over the rim. A locking ring 170 is then placed into the appropriate groove in the rim 160 and the tire inflated in the normal manner. The backing member 164 may be secured to the rim 160 in any manner desired to provide for extra strength. As shown in the inset in connection with FIG. 4, it is noted that the "foaming" system in accordance with the invention, can be a single cylinder which is pressurized with a suitable propellant gas so as to expel upon actuation foam material 171 and 172. Alternatively, separate reservoirs for each material may be provided.

While specific embodiments of the invntion have been shown and described, it is to be understood that persons skilled in the art will visualize additional modifications which are within the intent and scope of the invention which is to be construed and limited in accordance with the following claims wherein we claim:

1. An automatic tire inflation system for pneumatic tires of such size and shape as to fit upon and within the annular space defined by the three walls of a wheel rim comprising,
   at least two reservoirs adapted to contain fluid under pressure,
   pressure maintaining means attached to one of said reservoirs responsive to slight decreases in tire pressure for metering fluid from said reservoir so as to sustain a minimum pressure within a tire,
   reinflating means attached to the other of said reservoirs responsive to sudden and substantial decreases in tire pressure for rapidly releasing large amounts of fluids into a tire to maintain or substantially re-establish the tire's original contour.

2. An automatic tire inflation system for pneumatic tires of such size and shape as to fit upon and within the annular space defined by the three walls of a wheel rim comprising,
   at least one reservoir adapted to contain fluid under pressure,
   pressure maintaining means attached to staid reservoir responsive to slight decreases in tire pressure for metering fluid from said reservoir so as to sustain a minimum pressure within a tire,
   reinflating means attached to a reservoir responsive to sudden and substantial decreases in tire pressure for rapidly releasing large amounts of fluid into a tire to maintain or substantially re-establish a tire's original contour,
   a blowout liner having a cross section substantially smaller than that of the tire in which it is adapted to be contained,
   a pneumatic duct connecting the interior of said blowout liner and said re-inflation means, said blowout liner thus being adapted to receive fluid upon actuation of said reinflating means so as to allow said blowout liner to exert pressure against a tire causing it to expand substantially to its original shape.

3. An automatic tire inflation system as claimed in claim 2
   in which said pressure-maintaining means include a fluid output tube extending through said blowout liner in a hermetically sealed manner and which is adapted to extend into an annular cavity within a tire, whereby a system is created which is responsive to both limited pressure drop as would occur with a slow leak and sudden and substantial pressure drop as would occur in a blowout situation.

4. An automatic tire inflation system as claimed in claim 2 in which said pressure-maintaining means comprises
   a valve attached to said reservoir and mechanically operable to release pressurized fluid therefrom,
   a dashpot with a resilient diaphragm defining two separate hermetically isolated chambers therein,
   a tube connecting one of said chambers with ambient atmospheric pressure,
   a tube adapted to connect the other of said chambers to the inside of a tire casing,
   a plunger attached at one end to said diaphragm and adapted to exert mechanical force via the other end to said valve, whereby atmospheric pressure acting upon said diaphragm causes force via said plunger to actuate said valve, releasing fluid from said container upon a pressure drop in said tire pressure sensing chamber.

5. An automatic tire inflation system as claimed in claim 4
   which includes an arming system for substituting mechanical force upon said diaphragm to counteract atmospheric pressure.

6. An automatic tire inflation system as claimed in claim 5 in which said arming system comprises
   a mounting block to which said dashpot is secured,
   an atmospheric channel through said control block connecting the atmospheric pressure sensing chamber and tube of said dashpot to the atmosphere through a vent shaft in said mounting block which is in intersecting registry with said atmospheric channel,
   a cavity in said control block longitudinally aligned with said vent shaft,
   a control shaft mounted within said vent shaft terminating with its inner end within said cavity,
   at least one control lever pivotally attached at one end thereof to said control shaft within said cavity and at its other end to a rod which is secured to said diaphragm, said control lever being actuated when the end of said control shaft is forced into said cavity, whereby said control lever is cam actuated to effect a force on said rod and said diaphragm.

7. An automatic tire inflation system adapted to be mounted within the annular cavity formed by the three walls of the wheel rim comprising,
   a fluid containing reservoir,
   valve means attached to said reservoir adapted upon actuation to release fluid from said reservoir,
   actuating means associated with said valve means adapted to selectively operate said valve,
   said actuating means including a sensing means for sensing lost pressure in a tire,
   said sensing means including a dashpot having a diaphragm separating a tire pressure sensing chamber and an atmospheric pressure sensing chamber within said dashpot,
   a plunger attached to said diaphragm and adapted to operate said valve,
   biasing means mounted upon said plunger normally urging said plunger into operating communication with said valve,
   a blowout liner surrounding said automatic tire inflation system whereby fluid released from said reservoir will inflat said blowout liner thus restoring a tire to substantially its original contour,
   and means attached to the other side of said diaphragm and operable from outside said blowout liner to render said system inoperable until a preselected pressure is introduced into said tire pressure sensing chamber.

8. An automatic tire inflation system adapted to be positioned within a tire casing and mounted upon a wheel rim comprising
   at least two generally arcuate fluid containing reservoirs,
   valve means associated with each of said reservoirs,
   said reservoirs containing separate chemicals which react upon contact to produce a material of sufficient substance to support the weight of at least part of a vehicle and
   tire pressure sensing means associated with and adapted to actuate each of said valves.

9. An automatic tire inflation system as claimed in claim 8
   and which includes a blowout liner essentially surrounding said reservoirs and said sensing mechanism.

10. An automatic tire inflation system as claimed in claim 8 in which said sensing means includes
    at least one dashpot having two chambers separated by a movable diaphragm positioned therebetween, one of said chambers being vented to atmosphere, and the other of said chambers being open to pressure within a tire casing, and
    plunger means attached to said diaphragm for actuating both of said valves, whereby as pressure drops substantially within a tire casing, said valves are actuated to release chemicals from said reservoirs.

11. An automatic tire inflation system as claimed in claim 10 and in which
biasing means is attached to said diaphragm normally urging said diaphragm and said plunger means into operating relationship with respect to said valves, and
arming means is attached to the other side of said diaphragm for restricting the operation of the diaphragm and plunger means until a suitable preselected pressure has been introduced into the tire pressure sensing chamber of said dashpot.

12. An automatic tire inflation system adapted to be positioned upon a "flat" wheel rim and within a tire casing comprising
a generally circular backing member adapted to be mounted upon a flat wheel rim upon the removal of a locking ring from one side of said rim,
at least two generally arcuate cylinders attached to said backing member,
a valve associated with each of said cylinders, said cylinders being adapted to be filled with different chemicals which react upon mixture to form a plastic substance of sufficient strength to support at least a part of the weight of a vehicle,
first and second sensing means respectively associated with said reservoirs, said sensing means being adapted, upon actuation, to open the valves in said cylinders, thus releasing the chericals contained therein.

13. An automatic tire inflation system as claimed in claim 12 in which said sensing means each includes
a dashpot divided by a movable, flexible diaphrgam into two chambers hermetically isolated one from the other, one of the chambers in each of said dashpots being vented to atmosphere, the other of said chambers within each of said dashpots being adapted to sense the pressure in a tire casing,
tubes extending from the output of each of said valves and terminating in a common mixing chamber,
a plunger attached to each of said diaphragms and adapted to exert force upon each of said valves, respectively,
biasing means associated with each of said plungers normally urging said plungers into actuating relationship with said valves, and
arming means connected to each of said dashpots adapted to restrain said plungers from actuating said valves until a preselected pressure is introduced into the tire pressure sensing chambers of said dashpots.

14. An automatic tire inflation system as claimed in claim 13 in which said arming system includes
a control block mounted on said backing member and into which each of the atmospheric pressure sensing chambers of said dashpots are engaged,
an atmospheric channel within said mounting member connecting each of said atmospheric chambers with each other,
an atmospheric vent tube within said control block connected to the atmosphere through said backing member,
a cavity within said control block substantially longitudinally aligned with said vent tube,
a control rod mounted within said vent tube with one end terminating within said cavity,
a pair of control levels pivotally mounted at one end to said control shaft and at the other end to control rods which are attached at their opposite ends to the diaphragms in each of said dashpots, whereby as said control rod is pushed into said cavity, said control levers are constricted by the camming action of the walls of said cavity and exert a force upon said control rods which in turn maintain said diaphragms in a position preventing said plungers from actuating said valves.

References Cited

UNITED STATES PATENTS

| | | | |
|---|---|---|---|
| 1,128,455 | 2/1915 | Keith | 152—418 |
| 1,253,856 | 1/1918 | Marquette | 152—418 |
| 1,786,101 | 12/1930 | Welch | 152—9 XR |
| 3,196,922 | 7/1965 | Lundberg | 152—340 |

ARTHUR LA POINT, Primary Examiner